United States Patent
Tiwari et al.

(10) Patent No.: US 11,751,016 B2
(45) Date of Patent: Sep. 5, 2023

(54) DESTINATION IDENTIFICATION FOR FRICTIONLESS BUILDING INTERACTION

(71) Applicant: CARRIER CORPORATION, Palm Beach Gardens, FL (US)

(72) Inventors: Ankit Tiwari, East Hartford, CT (US); Kunal Srivastava, East Hartford, CT (US); Pedro Fernandez-Orellana, Shanghai (CN); Yuri Novozhenets, Pittsford, NY (US); Lakshman Subramanian, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/254,640

(22) PCT Filed: Jun. 13, 2019

(86) PCT No.: PCT/US2019/036880
§ 371 (c)(1),
(2) Date: Dec. 21, 2020

(87) PCT Pub. No.: WO2019/245832
PCT Pub. Date: Dec. 26, 2019

(65) Prior Publication Data
US 2021/0152980 A1 May 20, 2021

(30) Foreign Application Priority Data
Jun. 21, 2018 (CN) .......................... 201810647145.9

(51) Int. Cl.
*H04W 4/029* (2018.01)
*G07C 9/00* (2020.01)

(52) U.S. Cl.
CPC ........ *H04W 4/029* (2018.02); *G07C 9/00309* (2013.01); *G07C 9/00896* (2013.01)

(58) Field of Classification Search
None
See application file for complete search history.

(56) References Cited

U.S. PATENT DOCUMENTS 8,941,465 B2   1/2015 Pineau
9,311,586 B2   4/2016 Robinette et al.
(Continued)

FOREIGN PATENT DOCUMENTS

CN   202117430 U   1/2012
CN   105682021 A   6/2016
(Continued)

OTHER PUBLICATIONS

International Search Report for International Application No. PCT/US2019/036880; International filing date Jun. 13, 2019; dated Sep. 10, 2019; 5 pages.
(Continued)

*Primary Examiner* — Adolf Dsouza
(74) *Attorney, Agent, or Firm* — CANTOR COLBURN LLP

(57) ABSTRACT

A method of determining a destination of an individual carrying a mobile device is provided. The method including: detecting at least one of a position of the mobile device and an activity of an individual carrying the mobile device; detecting a distance between the mobile device and each of a plurality access controls; generating a list of the plurality of access controls and the distance between the mobile device and each of the plurality access controls; determining that the individual carrying the mobile device has stopped moving or slowed in response to the activity detected; and identifying one or more access controls of the plurality of access controls that have a distance of lowest magnitude on the list.

17 Claims, 3 Drawing Sheets

(56) References Cited

U.S. PATENT DOCUMENTS

| | | |
|---|---|---|
| 9,384,607 B1 | 7/2016 | Copeland et al. |
| 9,483,887 B1 | 11/2016 | Soleimani |
| 9,508,206 B2 | 11/2016 | Ahearn et al. |
| 9,524,594 B2 | 12/2016 | Ouyang et al. |
| 9,524,601 B1 | 12/2016 | Dumas |
| 9,761,070 B2 | 9/2017 | Juzswik |
| 9,805,533 B2 | 10/2017 | Shin et al. |
| 9,865,144 B2 | 1/2018 | Trani |
| 2011/0218709 A1 | 9/2011 | Hermann |
| 2013/0281084 A1* | 10/2013 | Batada .................... H04W 4/80 455/426.1 |
| 2015/0256980 A1 | 9/2015 | Ogalre et al. |
| 2015/0279132 A1 | 10/2015 | Perotti |
| 2017/0074000 A1* | 3/2017 | Banvait ............. G07C 9/00571 |
| 2017/0323123 A1 | 11/2017 | Rabb et al. |
| 2018/0357673 A1* | 12/2018 | Dumas ............... G06Q 30/0269 |

FOREIGN PATENT DOCUMENTS

| | | |
|---|---|---|
| EP | 2130312 A1 | 12/2009 |
| EP | 3147868 A1 | 3/2017 |
| WO | 2015191190 A1 | 12/2015 |
| WO | 2016087541 A1 | 6/2016 |
| WO | 2017180388 A1 | 10/2017 |
| WO | 2017199065 A1 | 11/2017 |

OTHER PUBLICATIONS

The August Lock; "The Smart Lock That Lets You Open Your Front Door Using Just Your Phone—and Can Even Let Guests in When You're Not Home"; Internet; URL: http://www.dailymail.co.uk/sciencetech/article-2333375/The-smart-Tock-lets-open-door-using-just-phone--let-guests-youre-home.html; 2018; 39 pgs.

Written Opinion of the International Searching Authority for International Application No. PCT/US2019/036880; International filing date: Jun. 13, 2019; dated Sep. 10, 2019; 8 pages.

Yang, et al.; "An Intelligent Automated Door Control System Based on a Smart Camera"; MDPI Sensors; Internet URL: https://www.ncbi.nlm.nih.gov/pmc/articles/PMC3690038/; May 2013; 22 pgs.

Chinese Office Action for Application No. 201810647145.9; dated Jun. 15, 2022; 13 Pages.

European Search Report for Application No. 19734611.7; dated Nov. 28, 2022; 6 Pages.

* cited by examiner

DESTINATION IDENTIFICATION FOR FRICTIONLESS BUILDING INTERACTION

CROSS-REFERENCE TO RELATED APPLICATIONS

This application is a National Stage Application of International Application No. PCT/US2019/036880 filed Jun. 13, 2019, which claims the benefit of Chinese Application No. CN 201810647145.9 filed Jun. 21, 2018, the disclosures of which are incorporated herein by reference in their entirety.

BACKGROUND

The subject matter disclosed herein generally relates to the field of access control systems, and more particularly to an apparatus and method for operating access control systems.

Existing access controls may allow an individual to unlock rooms via a mobile device but may have difficulty determining where the individual's final destination may be whenever a user intends to unlock rooms.

BRIEF SUMMARY

According to one embodiment, a method of determining a destination of an individual carrying a mobile device is provided. The method including: detecting at least one of a position of the mobile device and an activity of an individual carrying the mobile device; detecting a distance between the mobile device and each of a plurality access controls; generating a list of the plurality of access controls and the distance between the mobile device and each of the plurality access controls; determining that the individual carrying the mobile device has stopped moving or slowed in response to the activity detected; and identifying one or more access controls of the plurality of access controls that have a distance of lowest magnitude on the list.

In addition to one or more of the features described above, or as an alternative, further embodiments may include: actuating an access control of the plurality of access controls that has the distance of lowest magnitude on the list when only one access control has the distance of lowest magnitude on the list.

In addition to one or more of the features described above, or as an alternative, further embodiments may include: determining a favorite access control among the one or more access controls of the plurality of access controls that have a distance of lowest magnitude on the list; and actuating the favorite access control.

In addition to one or more of the features described above, or as an alternative, further embodiments may include that the favorite access control has been actuated by the mobile device more than any other access control of the one or more access controls of the plurality of access controls that have a distance of lowest magnitude on the list.

In addition to one or more of the features described above, or as an alternative, further embodiments may include that detecting a distance between the mobile device and each of a plurality access controls further includes: advertising a wireless signal; detecting the wireless signal; and detecting a strength of a wireless signal.

In addition to one or more of the features described above, or as an alternative, further embodiments may include that the plurality of access controls are configured to advertise a wireless signal and the mobile device is configured to detect the signal.

In addition to one or more of the features described above, or as an alternative, further embodiments may include that the mobile device control is configured to advertise a wireless signal and at least one of a wireless access protocol device and the plurality of access controls is configured to detect the signal.

In addition to one or more of the features described above, or as an alternative, further embodiments may include that a wireless access protocol device is configured to advertise a wireless signal and the mobile device is configured to detect the signal.

In addition to one or more of the features described above, or as an alternative, further embodiments may include that the wireless signal is Bluetooth.

In addition to one or more of the features described above, or as an alternative, further embodiments may include: removing from the list access controls of the plurality of access controls that have an increasing distance.

In addition to one or more of the features described above, or as an alternative, further embodiments may include: removing from the list access controls of the plurality of access controls that have a distance greater than a selected distance.

In addition to one or more of the features described above, or as an alternative, further embodiments may include that the position of the mobile device includes in a hand of an individual, a back pocket of an individual, or a front pocket of an individual.

In addition to one or more of the features described above, or as an alternative, further embodiments may include that the activity of the individual carrying the mobile device includes: sitting, standing, moving, slowing, accelerating, or stopping.

In addition to one or more of the features described above, or as an alternative, further embodiments may include: removing from the list access controls of the plurality of access controls that have a distance that is increasing over a period of time prior to when the individual carrying the mobile device has stopped moving or slowed.

In addition to one or more of the features described above, or as an alternative, further embodiments may include: actuating an access control of the plurality of access controls that has the distance of lowest magnitude on the list when the distance of lowest magnitude is less than a selected distance and only one access control has the distance of lowest magnitude.

According to another embodiment, a computer program product tangibly embodied on a computer readable medium is provided. The computer program product including instructions that, when executed by a processor, cause the processor to perform operations include: detecting at least one of a position of the mobile device and an activity of an individual carrying the mobile device: detecting a distance between the mobile device and each of a plurality access controls; generating a list of access controls and the distance between the mobile device and each of the plurality access controls; determining that the individual carrying the mobile device has stopped moving or slowed in response to the activity detected; and identifying one or more access controls of the plurality of access controls that have a distance of lowest magnitude on the list.

In addition to one or more of the features described above, or as an alternative, further embodiments may include: actuating an access control of the plurality of access controls that has the distance of lowest magnitude on the list when only one access control has the distance of lowest magnitude on the list.

In addition to one or more of the features described above, or as an alternative, further embodiments may include: determining a favorite access control among the one or more access controls of the plurality of access controls that have a distance of lowest magnitude on the list; and actuating the favorite access control.

In addition to one or more of the features described above, or as an alternative, further embodiments may include that the favorite access control has been actuated by the mobile device more than any other access control of the one or more access controls of the plurality of access controls that have a distance of lowest magnitude on the list.

In addition to one or more of the features described above, or as an alternative, further embodiments may include that detecting a distance between the mobile device and each of a plurality access controls further includes: advertising a wireless signal; detecting the wireless signal; and detecting a strength of a wireless signal.

Technical effects of embodiments of the present disclosure include tracking a location, position, and movement of a mobile device relative to access controls in order to determine which access the mobile device is heading towards.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
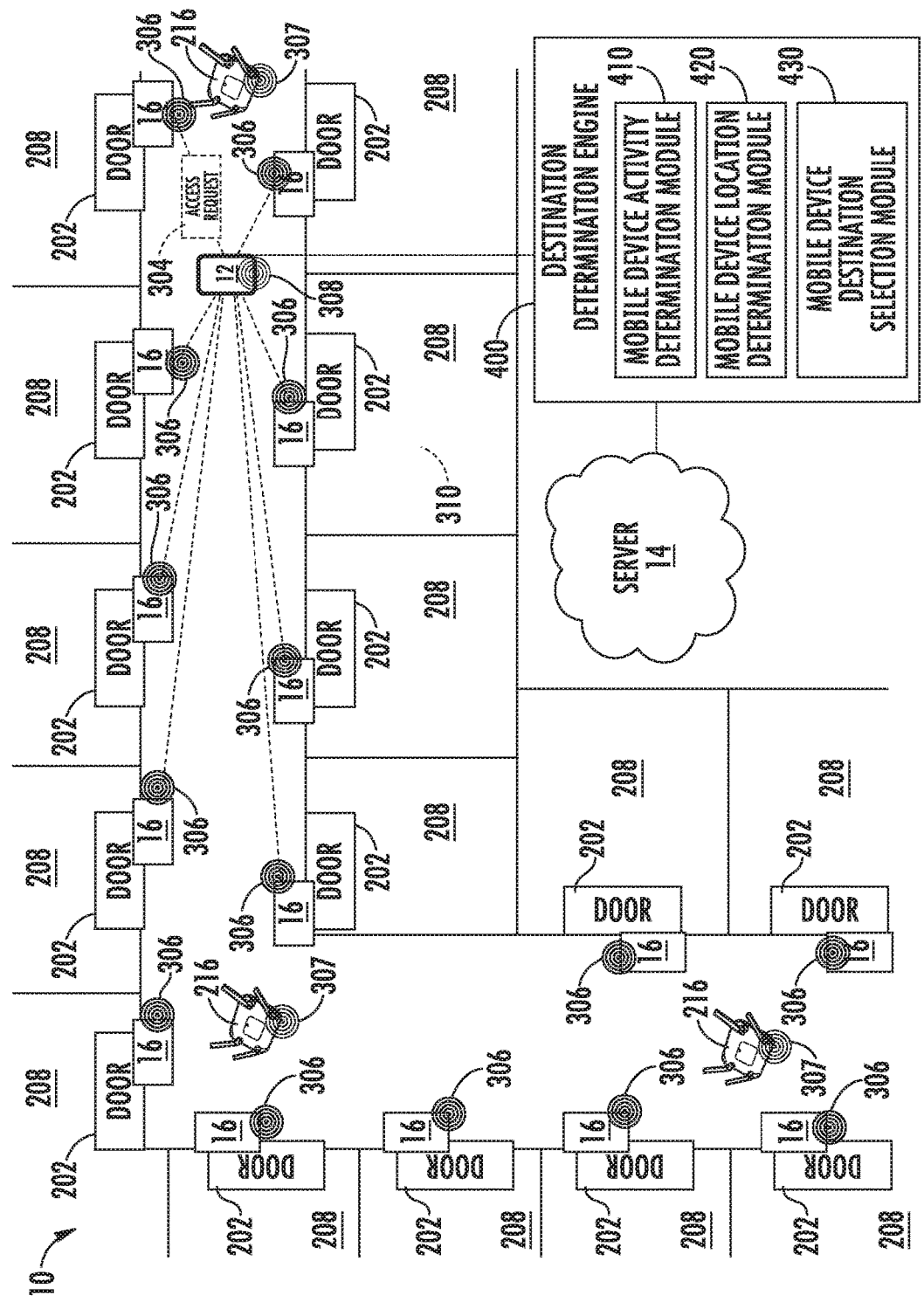
FIG. 1 illustrates a general schematic system diagram of an access control system, in accordance with an embodiment of the disclosure.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. It is understood that while the access control system 10 utilizes a door 202 and room 208 system for exemplary illustration, embodiments disclosed herein may be applied to other access control systems such as, for example, elevators, turnstiles, safes, etc. The access control system 10 may include any number of doors 202 and rooms 208. Further, there may be multiple doors 202 and access controls 16 for each room 208.

A mobile device 12 belonging to an individual may be granted access to one or more access controls 16 (e.g. the door lock on an office or hotel room assigned to the individual). In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through the mobile devices 12.

The system 10 may include a destination determination engine 400 configured to determine a destination access control 16 of the mobile device 12 as the mobile device is moving among one or more access controls 16. The destination determination engine 400 is comprised of modules including a mobile device activity determination module 410; a mobile device location determination module 420; and a mobile device destination selection module 430. Each module 410, 420, 430 may be located on either the mobile device 12 or the server 14. Alternatively, the modules 410, 420, 430 may be distributed between the mobile device 12 and the server 14.

The mobile device activity determination module 410 uses an inertial measurement unit (IMU) sensor 57 (see FIG. 2) on the mobile device 12 to detect a position of the mobile device 12 (e.g., how the mobile device is carried by the user—in a hand of an individual, a back pocket of an individual, a front pocket of an individual) and an activity of a user carrying the mobile device 12 (e.g., sitting, standing, moving, slowing, accelerating, and stopping). The IMU sensor 57 may be composed of one or more sensors including but not limited to an accelerometer and a light sensor. For example, the light sensor on the mobile device 12 may be used to determine if the mobile device 12 is in a pocket/bag or in hand and this information may be used to adjust for the signal strength. The mobile device location determination module 420 is configured to determine a location of the mobile device 12 with the system 10 in response to positional data. The collection of positional data is discussed further below. The mobile device location determination module 420 is configured to further refine the location of the mobile device 12 in response to the position of the mobile device detected by the mobile device activity determination module 410 (e.g., a different location offset is applied if the mobile device 12 is in back pocket vs. front pocket of the individual carrying the mobile device 12). Knowing the position of the mobile device 12 is advantageous because the human body can cause interference in signal strength for wireless signals (e.g., Wi-Fi, Bluetooth, etc.), thus having the mobile device 12 in front or back pocket may cause the mobile device 12 to be in direct line of sight of the access control 16 or position an individual's body in between the mobile device 12 and the access control 16.

The mobile device destination selection module 430 is configured to select a desired destination of the individual carrying the mobile device in response to the position of the mobile device 12, the activity of an individual carrying the mobile device 12; and the location of the mobile device 12. The desired destination will be the specific access control 16 where the individual is determined to be heading.

The positional data of the mobile device 12 may be detected using one or more methods and apparatus. The positional data may be collected by the mobile device 12 and/or the server 14. The positional data may include a location of the mobile device 12 and/or a movement of mobile device 12 that is a derivative of a location of the mobile device 12, such as, for example, velocity, acceleration, jerk, jounce, snap . . . etc. The mobile device 12 may a determine positional data by the GPS 48, by the IMU sensor 57, wireless signal strength, and/or by triangulating wireless signals 307 from the wireless access protocol device(s) 216 or wireless signals 306 from the access control(s) 16. The location of the mobile device 12 may also be detected through triangulation of wireless signals emitted from the mobile device 12 or signal strength of wireless signals emitted from the mobile device 12. The location of the mobile device 12 may be detected using any other desired and known location detection/position reference means.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306. Positional data of the mobile device 12 may include a location of the mobile device 12 relative to the access control 16.

Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a positional data of the mobile device 12 in response to a signal strength of the wireless signal 307.

Positional data of the mobile device 12 may also be determined using the wireless access protocol device 216 and/or the access controls 16 to detect a signal advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a positional data of the mobile device 12 in response to a signal strength of the wireless signal 308. The location of the mobile device 16 may be triangulated by relaying up to the location determination module 420 the strength of each wireless signal 308 detected and then the location determination module 420 can triangulate the position.

Wireless signal interaction data between the mobile device 12 and at least one of the access device 216 and the wireless access protocol device 216 may transmitted to the server 14 to determined positional data. In an embodiment, the location determination module 420 may be located on the server 14 and may be used to determine positional data. The server may use signal strength detected between the mobile device 12, access controls 16, and the wireless access protocol device 216 to determine positional data of the mobile device 12.

Figure 2:
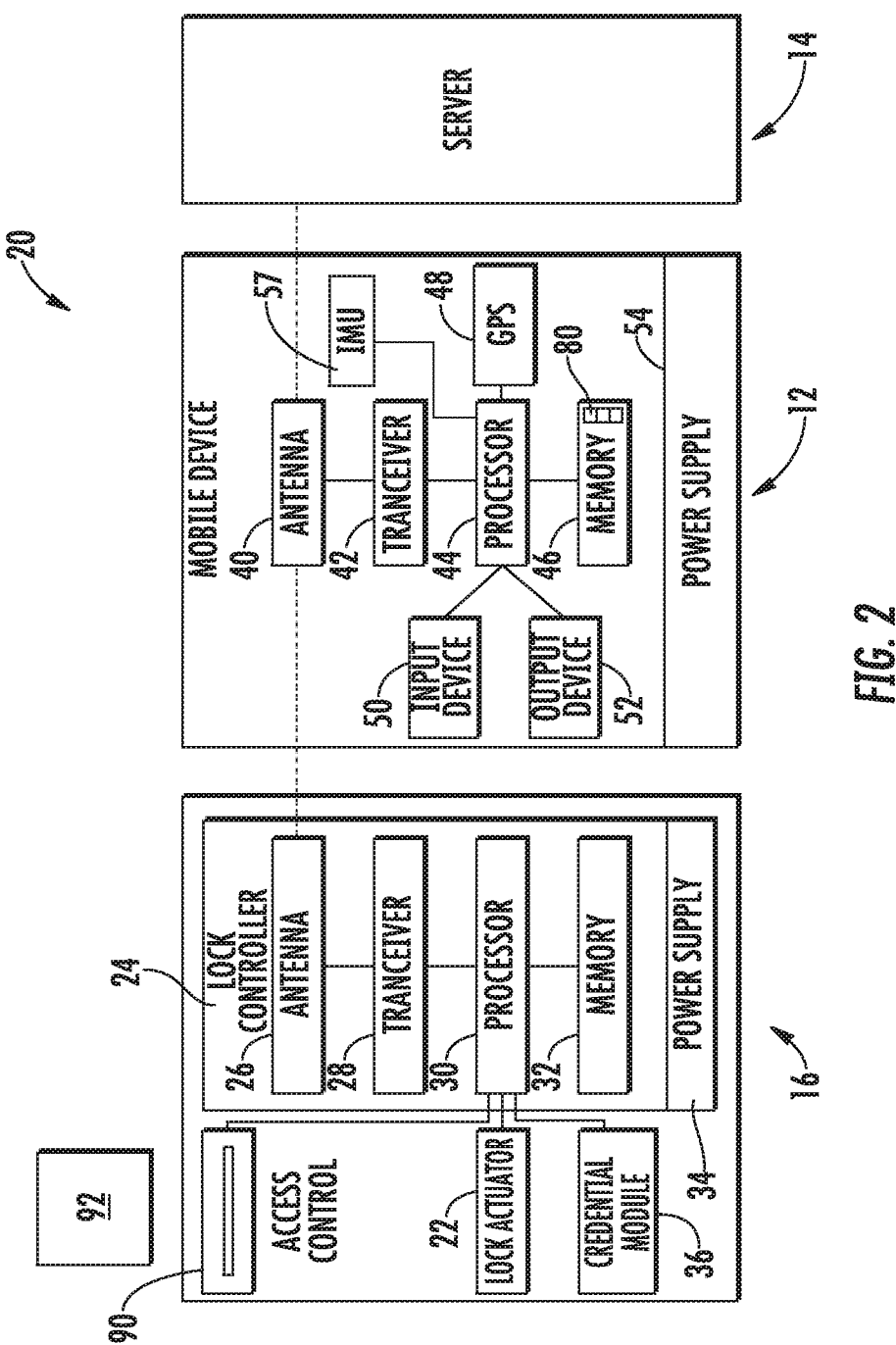
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components—a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an IMU sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
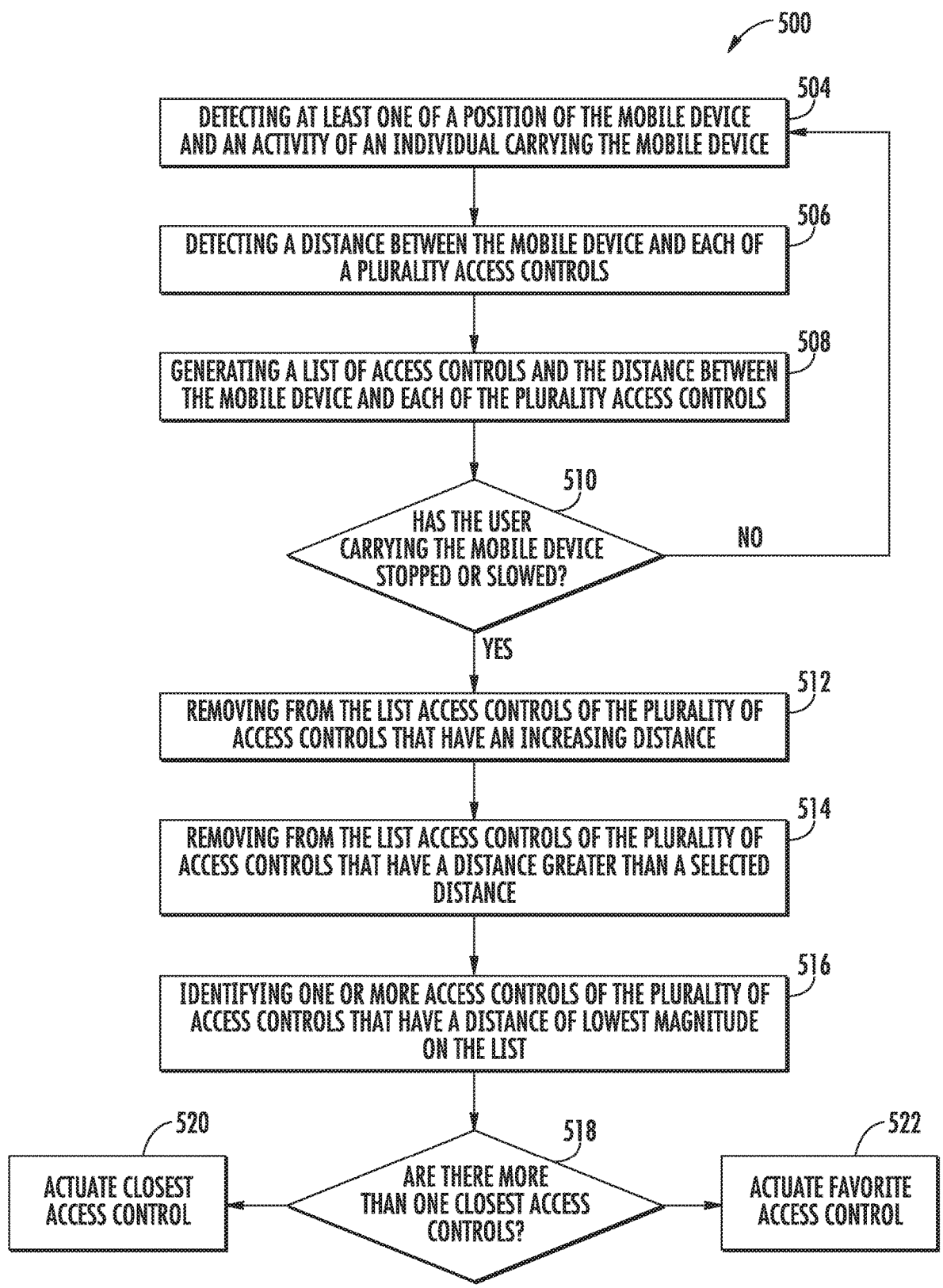
FIG. 3 is a flow diagram illustrating a method of determining a destination of an individual carrying a mobile device, according to an embodiment of the present disclosure.

Referring now to FIG. 3 with continued reference to FIGS. 1-2. FIG. 3 shows a flow chart of method 500 of determining a destination of an individual carrying a mobile device 12. The method 500 may be performed by the mobile device 12 and/or the server 14. At block 504, at least one of a position of the mobile device 12 and an activity of an individual carrying the mobile device 12 is detected. At block 506, a distance between the mobile device 12 and each of a plurality access controls 16 is detected. At block 508, a list of the plurality of access controls 16 and the distance between the mobile device 12 and each of the plurality access controls 16 is generated. The list may include access controls 16 that the mobile device 12 is authorized to access and/or access controls 16 that the mobile device is not authorized to access. At block 510, it is determined whether an individual carrying the mobile device 12 has stopped moving or slowed in response to the activity or distance detected. If the individual has not stopped moving or slowed then the method 500 returns to block 504 but if individual has stopped moving or slowed then the method 500 will move on to block 512. At block 512, access controls 16 of the plurality of access controls 16 that have an increasing distance are removed from the list. At block 514, access controls 16 of the plurality of access controls 16 that have a distance greater than a selected distance are removed from the list. The method 500 may also include: removing from the list access controls 16 of the plurality of access controls 16 that have a distance that is increasing over a period of time prior to when the individual carrying the mobile device 12 has stopped moving or slowed. For example, particular access controls 16 may be removed from the list when it is determined that the individuals carrying the mobile device 12 is moving away from the particular access controls 16.

At block 516, one or more access controls 16 of the plurality of access controls 16 that have a distance of lowest magnitude on the list are identified (i.e., these access controls are closest to the mobile device 12). At block 518, if only one access control 16 has a distance of lowest magnitude on the list then the method 500 moves to block 520 but if there are two or more access controls 16 both having a distance of lowest magnitude on the list then the method 500 moves to block 522. At block 520, if only one access control 16 has the distance of lowest magnitude on the list then that access control 16 may be actuated. Actuating may include unlocking/locking the door that the access control 16 is located. At block 522, if there are two or more access controls 16 having a distance of lowest magnitude on the list then then access controls 16 that the mobile device is not authorized to access are removed from the list. If there are two or more access controls 16 controls 16 having a distance of lowest magnitude on the list and the mobile device is authorized to access each access control 16 then a favorite access control 16 among the one or more access controls 16 of the plurality of access controls 16 that have a distance of lowest magnitude on the list is determined and then that favorite access control 16 is actuated. The favorite access control 16 may have been manually designated as the favorite by the individual with the mobile device 12 or it may be the access control 16 has been actuated by the mobile device 12 more than any other access control 16 of the one or more access controls 16 of the plurality of access controls 16 that have a distance of lowest magnitude on the list. The method 500 may further include: actuating an access control 16 of the plurality of access controls 16 that has the distance of lowest magnitude on the list when the distance of lowest magnitude is less than a selected distance and only one access control has the distance of lowest magnitude. The selected distance may be a threshold distance for basic operation of the access control 16. For example, an access control 16 may be determined to have the distance of lowest magnitude on the list however the individual is still too far away to actuator this access control 16.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of determining a destination of an individual carrying a mobile device, the method comprising:
   detecting a position of the mobile device and an activity of an individual carrying the mobile device;
   detecting a distance between the mobile device and each of a plurality access controls;
   generating a list of the plurality of access controls and the distance between the mobile device and each of the plurality access controls;
   determining that the individual carrying the mobile device is slowing down but still moving based on the activity detected;
   identifying one or more access controls of the plurality of access controls that have a distance of lowest magnitude on the list in response to the mobile device slowing down but still moving;
   actuating an access control of the plurality of access controls that has the distance of lowest magnitude on the list when only one access control has the distance of lowest magnitude on the list;
   wherein actuating the access control includes unlocking a door lock.

2. The method of claim 1, further comprising:
   determining a favorite access control among the one or more access controls of the plurality of access controls that have a distance of lowest magnitude on the list; and
   actuating the favorite access control.

3. The method of claim 2, wherein the favorite access control has been actuated by the mobile device more than any other access control of the one or more access controls of the plurality of access controls that have a distance of lowest magnitude on the list.

4. The method of claim 1, wherein detecting a distance between the mobile device and each of a plurality access controls further comprises:
   advertising a wireless signal;
   detecting the wireless signal; and
   detecting a strength of a wireless signal.

5. The method of claim 4, wherein the plurality of access controls are configured to advertise a wireless signal and the mobile device is configured to detect the signal.

6. The method of claim 4, wherein the mobile device control is configured to advertise a wireless signal and at least one of a wireless access protocol device and the plurality of access controls is configured to detect the signal.

7. The method of claim 4, wherein a wireless access protocol device is configured to advertise a wireless signal and the mobile device is configured to detect the signal.

8. The method of claim 4, wherein the wireless signal is Bluetooth.

9. The method of claim 1, further comprising:
removing from the list access controls of the plurality of access controls that have an increasing distance.

10. The method of claim 1, further comprising:
removing from the list access controls of the plurality of access controls that have a distance greater than a selected distance.

11. The method of claim 1, wherein the position of the mobile device includes in a hand of an individual, a back pocket of an individual, or a front pocket of an individual.

12. The method of claim 1, further comprising:
removing from the list access controls of the plurality of access controls that have a distance that is increasing over a period of time prior to when the individual carrying the mobile device is slowing down.

13. The method of claim 1, further comprising:
actuating an access control of the plurality of access controls that has the distance of lowest magnitude on the list when the distance of lowest magnitude is less than a selected distance and only one access control has the distance of lowest magnitude.

14. A computer program product tangibly embodied on a non-transitory computer readable medium, the computer program product including instructions that, when executed by a processor, cause the processor to perform operations comprising:
detecting a position of the mobile device and an activity of an individual carrying the mobile device;
detecting a distance between the mobile device and each of a plurality access controls;
generating a list of access controls and the distance between the mobile device and each of the plurality access controls;
determining that the individual carrying the mobile device is slowing down but still moving based on the activity detected;
identifying one or more access controls of the plurality of access controls that have a distance of lowest magnitude on the list in response to the mobile device slowing down but still moving;
actuating an access control of the plurality of access controls that has the distance of lowest magnitude on the list when only one access control has the distance of lowest magnitude on the list;
wherein actuating the access control includes unlocking a door lock.

15. The computer program product of claim 14, further comprising:
determining a favorite access control among the one or more access controls of the plurality of access controls that have a distance of lowest magnitude on the list; and
actuating the favorite access control.

16. The computer program product of claim 15, wherein the favorite access control has been actuated by the mobile device more than any other access control of the one or more access controls of the plurality of access controls that have a distance of lowest magnitude on the list.

17. The computer program product of claim 14, wherein detecting a distance between the mobile device and each of a plurality access controls further comprises:
advertising a wireless signal;
detecting the wireless signal; and
detecting a strength of a wireless signal.

\* \* \* \* \*